United States Patent [19]

Maillet

[11] 3,813,496

[45] May 28, 1974

[54] TDMA BURSTS ACQUISITION SYSTEM

[75] Inventor: Wilfrid G. Maillet, Gaithersburg, Md.

[73] Assignee: Communications Satellite Corporation, Washington, D.C.

[22] Filed: Oct. 2, 1972

[21] Appl. No.: 293,905

[52] U.S. Cl. .......... 179/15 BS, 325/4

[51] Int. Cl. .......... H04j 3/06

[58] Field of Search .......... 179/15 BS; 325/4; 178/69.5 R

[56] References Cited

UNITED STATES PATENTS

| | | | |
|---|---|---|---|
| 3,593,138 | 7/1971 | Dunn | 325/4 |
| 3,643,031 | 2/1972 | Sasaki | 179/15 BS |
| 3,730,998 | 5/1973 | Schmidt | 179/15 BS |

*Primary Examiner*—Ralph D. Blakeslee

*Attorney, Agent, or Firm*—Sughrue, Rothwell, Mion, Zinn & Macpeak

[57] ABSTRACT

In a time division multiple access communication system, burst time acquisition is accomplished automatically and rapidly taking advantage of the known range to the satellite. When the transmitter is turned on or when burst synchronization is lost, a low power acquisition signal, occurring at the frame rate and controlled in time by the burst synchronizer start pulse, is transmitted. At the receiver, an aperture is generated providing a window occupying all or a portion of the time slot assigned to the burst of the station. The acquisition signal is caused to precess across the entire frame until the acquisition signal is received during the generation of said window. When the latter occurs the start time is set back a number of bit positions corresponding to the amount of precession of the acquisition signal during a round trip delay time from the station to the repeater and back to the station. The normal burst transmission resumes thereafter.

9 Claims, 3 Drawing Figures

PATENTED MAY 28 1974

3,813,496

SHEET 1 OF 3

TDMA BURSTS ACQUISITION SYSTEM

BACKGROUND OF THE INVENTION

The invention is in the field of time division multiple access (TDMA) communication systems, and more particularly is an automatic burst acquisition system for a TDMA system.

As is well known, a TDMA system is one in which multiple transmit/receive stations access a repeater, such as a satellite, a pre-assigned non-overlapping times. Each station sends out a burst of communication which ideally arrives at the repeater just after a burst from a preceeding station and just before a burst from a succeeding station. Bursts are transmitted periodically at the communication system frame rate. The frame format comprises serially timed bursts from the stations in the communications network.

The positioning of a station's burst within each frame is critical. Acquisition is the technique of placing the burst within the proper time slot within each frame. Synchronization is the technique of maintaining the burst in its proper position. Systems are known for accomplishing burst acquisition and burst synchronization.

One particular burst synchronization system for TDMA communication systems is described and claimed in U.S. Pat. No. 3,562,432 to O. Gabbard issued Feb. 9, 1971. In the latter-mentioned system each station burst includes a preamble portion followed by a data portion. The preamble portion includes, inter alia, a code word, known as a unique word, which serves certain synchronizing functions and also serves to identify the station where the burst originated. One station's unique word is designated as the reference unique word or master station sync word, and all other stations synchronize their bursts to the reference unique word. The format of the frame is known and thus the burst position or time slot of each station's burst within the frame relative to said reference unique word is known. The unique words from all stations other than the reference station may be and preferably are identical to one another. The station bursts can be distinguished easily from one another by their time of reception relative to the time of reception of the reference unique word. Alternately or as a check on burst identification, each station may send out a station address code as part of its preamble. In either case the bursts received by all stations are identified by these known techniques.

The burst synchronization system of the above-mentioned patent includes a frame counter which recycles every N input clock pulses, where N is the number of clock pulses in a TDMA frame. A decoded output of the frame counter is the start pulse which starts burst transmission. The particular number decoded by the decoder is irrelevant as long as it is less than the minimum number at which the frame counter recycles. The start pulses will occur at the frame rate and the bursts will therefore be transmitted at the frame rate.

The receiver detects the reception of the reference unique word and the unique word contained in local station's burst (known as the local station unique word). If the time separation of these two detected unique words is the same as the assigned time separation between the reference station burst and the local station burst, that means that the burst transmission time at the transmitter is correct. If the time separation is not the same, the system operates to shift the start pulses forward or backward in time to advance or delay the start of each burst transmission. Advancing or retarding the burst start time depends upon the direction of the error, i.e., whether the local station unique word is received too soon or too late in the frame, and the magnitude of the error, i.e., how early or how late the local station unique word is received.

If the burst position becomes so grossly out of position that it overlaps other bursts, the system is out of sync and the burst transmission must be terminated until the proper position can be acquired. Loss of synchronization can be caused by many factors, such as power outages. Acquisition of the proper position takes place when there is a loss of synchronization or when the station is first turned on. Generally, acquisition systems operate by sending out a low power signal which is distinguishable from burst transmissions and which does not seriously interfere with the bursts transmitted from the other stations. The acquisition signal is detected and its position within the received frame is controlled by varying the transmit time of the acquisitions signal until it is received in the station's assigned burst position time slot.

One known acquisition system is manual. The operator views the received acquisition signal on an oscilloscope and varies the transmit time of said signal until the received acquisition signal appears on the scope in the pre-assigned time slot. When this occurs the transmit time, which repeats once per frame, is used to start burst transmission. The problem with manual systems is that they take too long.

Other systems are known for automatically acquiring the burst position at turn on time or when synchronism is lost. One particular prior art system is described and claimed in U.S. Pat. application of Schmidt et al, Ser. No. 170,929, filed Aug. 11, 1971. In the latter-mentioned application part of the apparatus comprising the burst synchronizer enters into the acquisition function. When the system first turns on or when synchronization is lost, the transmitter modulator is disabled to prevent burst transmission. The start pulses from the burst synchronizer control generation of an acquisition signal waveform having transitions at the frame rate. The latter waveform is applied to a low power modulator whose output is 20 dB down from the normal burst transmission. The acquisition signal is transmitted and detected after round trip through the satellite. The detected acquisition signal is substituted for the local unique word at the burst synchronizer input. The burst synchronizer, which is the type described in the above-mentioned Pat. No. 3,562,432, operates to shift the start pulses until the acquisition signal occurs in the assigned burst position time slot. When this occurs, the system switches out of the acquisition mode and turns on the normal modulator thereby resuming burst transmission at the readjusted start time.

One of the problems with the above-mentioned system is that the acquisition signal will arrive in time coincidence with received bursts from other stations. This will normally happen until the acquisition signal is moved to the proper time slot. The acquisition signal will thus be noisy and will experience jitter, i.e., the timing of the acquisition signal will not be sufficiently accurate to properly operate the burst synchronizer. To overcome the jitter problem the above-mentioned system averages the acquisition arrival time over a large number of frames and the averaged time of reception is applied to the synchronizer as the detected acquisition signal.

Other types of automatic acquisition systems use psuedo random codes as the acquisition signal.

SUMMARY OF THE INVENTION

In accordance with the present invention, an automatic acquisition system is provided which is rapid, which does not need psuedo random codes, and which does not need time detection averaging.

The invention examines the acquisition signals only during the assigned time slot when no other bursts are being received. Consequently the jitter problem is avoided. The invention makes use of the known range from the station to the satellite.

When there is a loss of synchronization or when the station is first turned on, the information modulator is disabled to prevent burst transmission. The start signals, occurring at the frame rate, are divided by two resulting in a square wave having transitions occurring at the frame rate. These transitions are the acquisition signals. The square wave is applied to a low power modulator whose output is at least 20 dB down from normal transmission. The acquisition signals are precessed or scanned across the frame. This is accomplished by forcing the frame counter, which normally recycles at N (where N equals the number of clock pulses per frame), to recycle at some number other than N, e.g., N+2. This causes the start pulses to be delayed by two bit positions per frame relative to the beginning of each frame.

On the receive side the detected reference unique word is applied to an aperature generator which generates a window or aperature which extends over all or a portion of the time slot assigned to the local station. The aperature does not extend over any time slots assigned to other stations. Only those acquisition signals which occur during the aperature are detected.

At the time the acquisition signal is detected it has arrived during the time slot assigned to the local station. This means that the start pulse which generated that particular acquisition signal was at the proper transmit time. However that start signal occurred approximately one-third of a second ago; the round trip time to the satellite. Also, since then the start signal has been delayed 2X bits, where X is the number of frames occurring during the round trip delay time. Since X is known, plus or minus a few frames, the proper start time can be obtained by causing the frame counter to recycle at N−K for one frame only, where K=2X. Following the single frame at which the frame counter recycles at N−K, the counter is put back into the normal mode, wherein it recycles at counts of N, and burst transmission is resumed. It will be noted that the lack of accuracy of X is not important so long as X is approximate. For example if the number of frames per round trip is known to be 1,040 ±2, by setting X=1,040, the maximum error, i.e., ±2 frames, will only cause the N−K correction recycle to be off by four bits (two bits per frame times two frames). In a typical system having a 50 megabit clock rate this amounts to an offset of only a few nanoseconds.

The aperature preferably covers a small portion of the assigned slot, e.g., the first fourth of the slot. When the acquisition signal is detected it may occur anywhere within the slot and obviously it will not necessarily be at the exact position where the burst should start. However, it is the assigned time slot and is sufficiently close to the exact position of the beginning of the burst for the burst synchronization apparatus to take over and move the burst to its exact assigned position.

If the aperature were extremely small and positioned at the exact beginning of burst position, i.e., two bits wide, the detection of the acquisition signal within the aperature would mean that the acquisition signal is in the exact position corresponding to the beginning of the burst. However, this is not practical. A wider aperature allows faster detection of the acquisition signal, prevents a spurious signal which might appear during the aperature from triggering the system back into the burst synchronization mode, and allows the system to operate even though the exact number of frames per round trip delay may not be precisely known.

As pointed out above when the acquisition signal is detected in coincidence with the aperature, the frame counter recycles at N−K for one frame only and when normal burst synchronization takes place. Assume, as an example, that the normal burst is 10 μsec, 2 μsec for preamble and 8 μsec for data. Also assume that the aperature covers the first 4 μsec of a 12 μsec time slot assigned to the station burst. Further assume that the acquisition signal is first satisfactorily detected in the latter part of the window, i.e., around 4 μsec from the start of the time slot. Following the N-K recycling, if the full 10 μsec burst were transmitted it would begin 4 μsec into the time slot and end 14 μsec from the beginning of the time slot thereby overlapping the burst in the subsequent time slot until the burst synchronizer can pull the burst back to its accurate position.

To prevent the latter condition from occurring, when burst transmission is resumed after completing acquisition, only the preamble portion and not the data portion is transmitted. The preamble is small enough so that no overlapping, as in the above hypothetical example, will occur. Also, since the preamble contains the local station unique word, enough information will be provided to enable the burst synchronizer to pull the preamble to the beginning of the assigned time slot. When synchronization is fully achieved, the full burst, including preamble and data portion will be transmitted.

DETAILED DESCRIPTION

Figure 1:
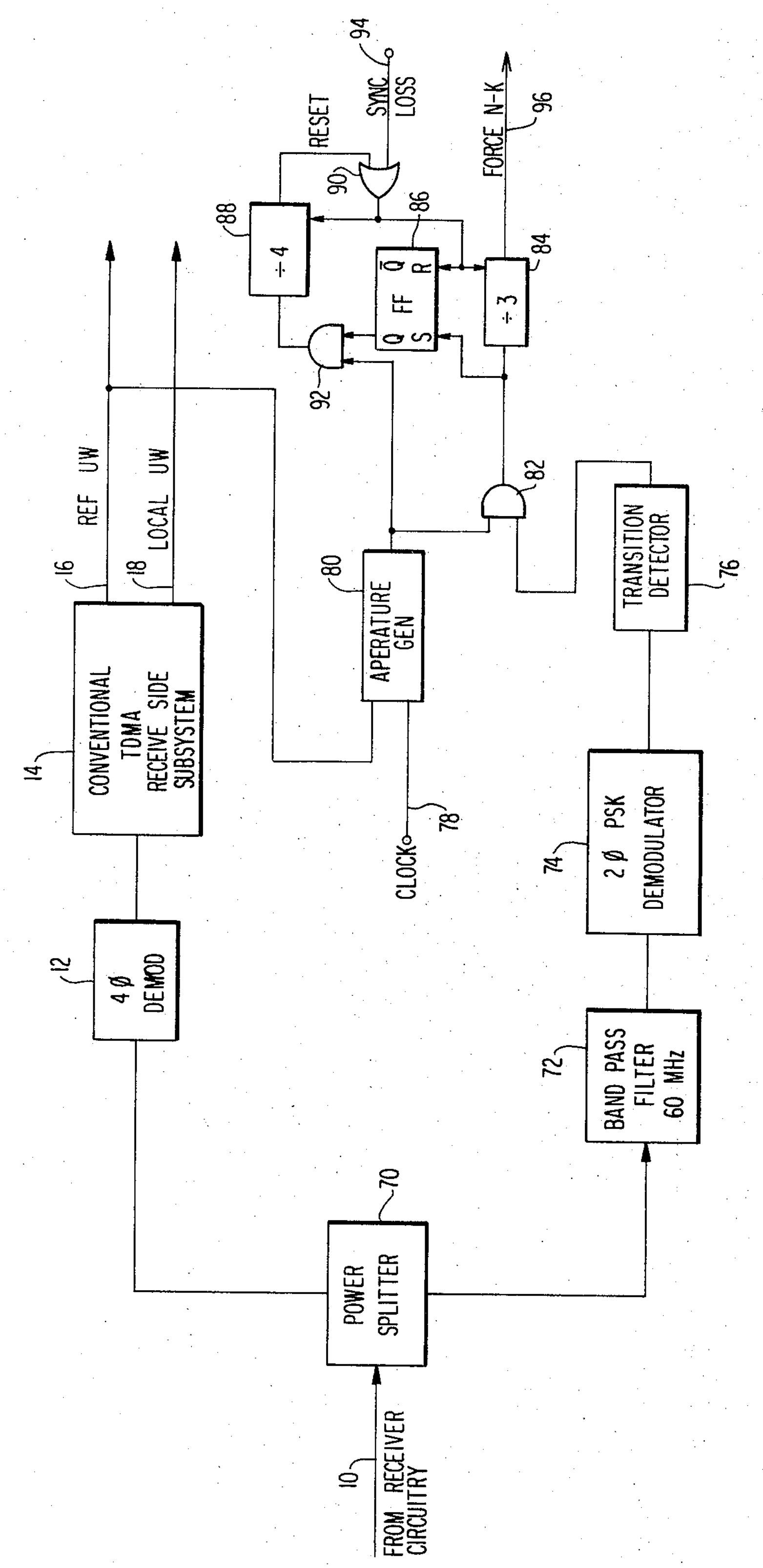
FIGS. 1, 2 and 3 taken together represent a block diagram of a preferred embodiment of the present invention.

In the preferred embodiment, as illustrated in the drawings, the invention is obtained by adding certain additional logic to a conventional TDMA transmit-receive station having a burst synchronizer of the type described in the above-mentioned Gabbard patent. The burst synchronizer is illustrated in some detail herein in order to provide a complete understanding of how the additional logic cooperates with the latter burst synchronizer system. No details, other than broad blocks indicating general functions, are given for the remainder of the TDMA system since such systems are well known in the art. In particular, by way of example only, one TDMA transmit/receive system into which the subject invention could be incorporated is disclosed in the above mentioned Schmidt et al application.

Initially, the overall system illustrated in the drawings will be described without reference to the added logic which performs the inventive acquisition function. Subsequently, the additions to the prior art will be discussed in detail.

The drawings illustrate a single transmit/receive station and will be described in connection with a TDMA satellite communications network. Each station, similar to the station illustrated, transmits a burst of information which is destined to arrive at the satellite in a particular time slot within each frame. By way of example, a frame is assumed to be 125 microseconds in length, although other frame durations are known. Within each frame the bursts of the various stations arrive at the satellite, assuming they are synchronized, serially with the burst from station A, designated the reference station, including in its preamble portion a reference unique word which allows all stations to synchronize their respective bursts. As is well known, the reference station sends out its burst once each frame, in other words at an 8 kHz rate, and does not need to perform the synchronization operation since all other bursts are synchronized to the reference station burst. However, as is also well known in the art, apparatus is known for switching the reference function to other stations in case the first designated reference station is not operating for any reason.

Figure 2:
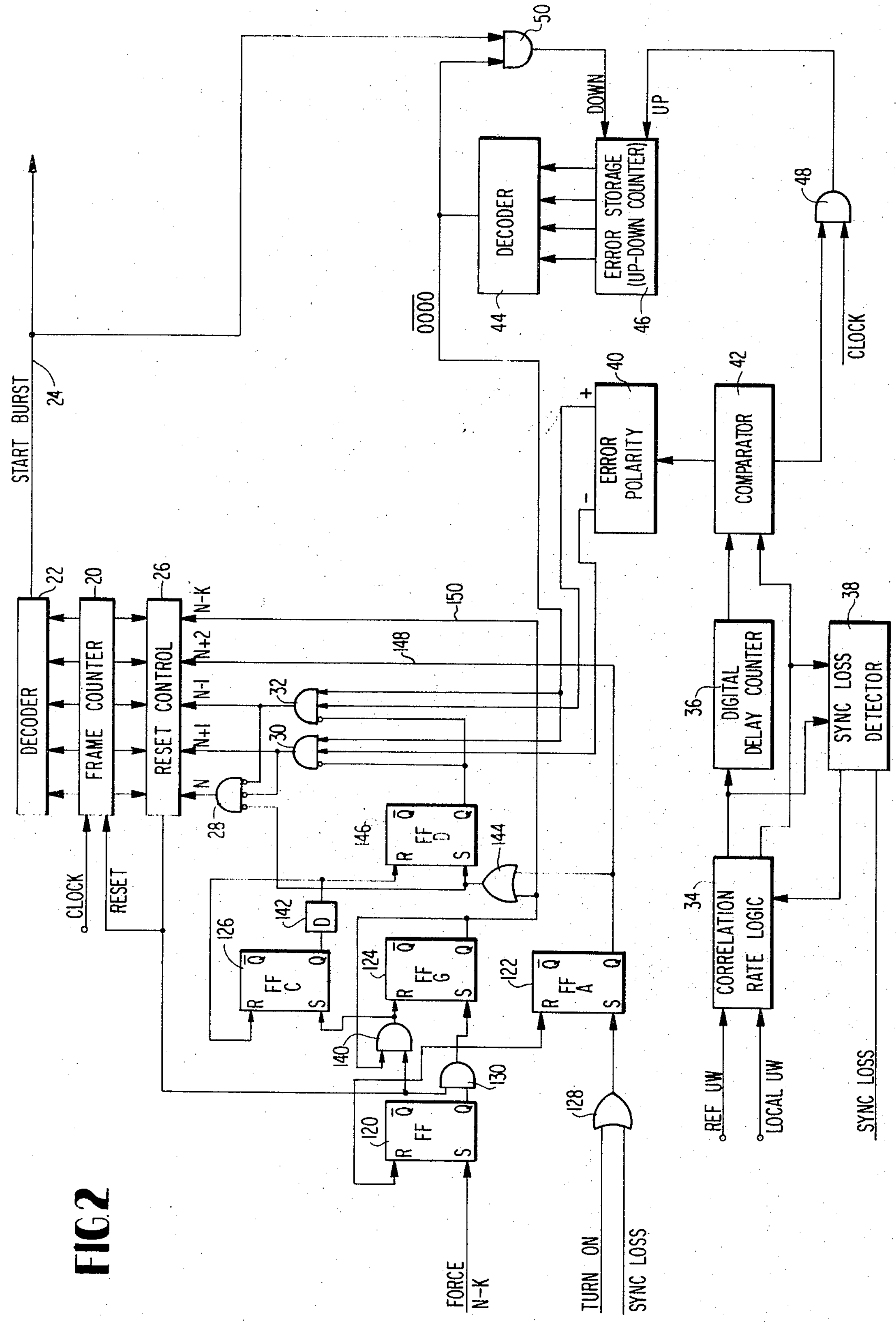

Referring first to FIG. 2, the burst synchronizer of the local station includes a frame counter 20 which receives clock pulses occurring at the system bit rate which, in the example herein is 50 megabits per second. The frame counter contents is applied to reset control means 26, which resets the frame counter. For the present it is sufficient to understand that the reset control counter provides a reset output to reset the frame counter 20 to a count of zero whenever the frame counter contains a count of N, where N equals the number of clock pulses occurring during a 125 microsecond period (N=6,250). Under these conditions, the frame counter 20 recycles once each frame, i.e., at an 8kHz rate. A decoder 22 also receives the frame counter contents and is set at any number less than N to provide an output pulse on line 24 which is designated as the start burst signal. The start burst signal on line 24 also occurs at the 8 kHz rate and conventionally controls the start of transmission of the local station burst. Although it is not imperative that the local station start its burst transmission immediately upon the occurrence of each start burst signal 24, it is important that the start burst signal 24 control the exact time of transmission. For example, the beginning of burst transmission could occur a fixed period of time following the generation of the start burst signal. In order to simplify the present explanation it will be assumed that the burst transmission is started immediately upon the occurrence of the start burst signal on line 24.

Figure 3:
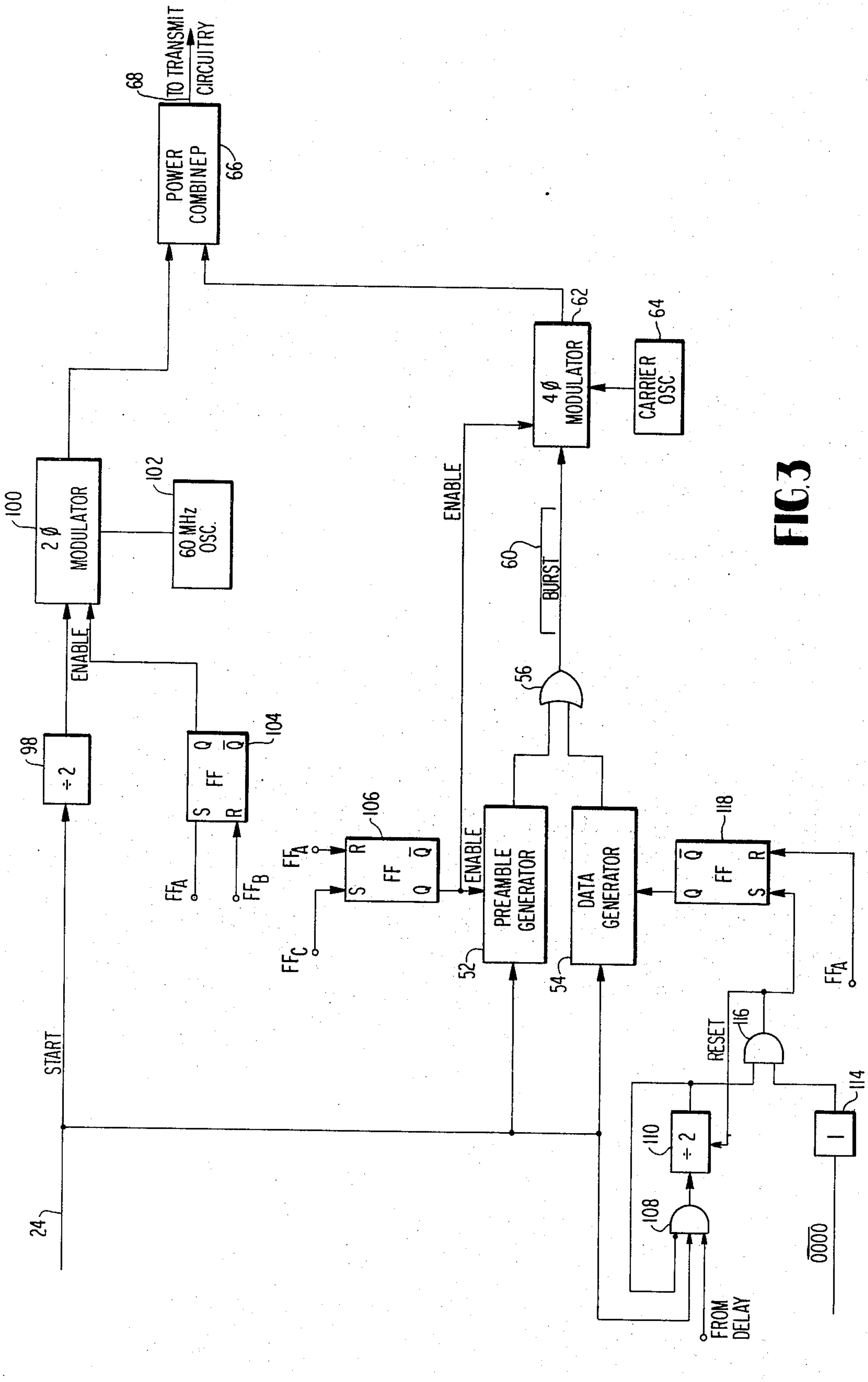

Referring to FIG. 3, which shows, in part, the transmit side portion of the local station, the start burst signal on line 24 is applied to a preamble generator 52 and a data generator 54. As will be appreciated by any one of ordinarily skill in the art, the preamble of the local station burst and the data contained in the local station burst are generated by well known circuitry which typically includes unique word generators and card word generators to form the preamble, and includes various PCM circuits and possibly multiplexing circuits for generating the data in serial form. However, since the particular form of the circuitry which generates the preamble and the circuitry which generates the data is not a novel feature of the present invention, and further since such particular circuitry is known in the art, no further details of generators 52 and 54 are given herein. When the start signal is received by the preamble generator 52 it provides the preamble portion of the burst at its output which passes through OR gate 56. Also, as is well known, and as described above in the summary, the preamble includes a unique word, which by its occurrence in the particular burst position within the frame and/or by its association with an added station address code, uniquely identifies the local transmitting station and will be referred to herein as the local station unique word. Immediately following the termination of the preamble portion, the data generator 54 provides the data bits at its output which also passes through OR gate 56. The combination of the preamble and the data portion comprises the burst 60 which is modulated on modulator 62 and passed through power combiner 66 to the transmit circuitry 68. The burst is up converted to the satellite up-link frequency and transmitted to the satellite. By way of example only, the modulator 62 is shown as a four-phase PSK modulator which receives an additional input from a carrier oscillator 64.

The burst 60 occurs at the 8 kHz rate and appears at the satellite, assuming it is synchronized, in the proper position within the TDMA frame along with bursts from the other stations in the network.

Referring now to FIG. 1 which shows, in part, the receive side of the local station, the station receives at its antenna all of the bursts retransmitted by the satellite in the same time format as said bursts appeared at the satellite. After being down converted in frequency in the receiver circuitry, the signals are applied through a power splitter 70 to the demodulator 12, whose output in turn is applied to the conventional TDMA receive side sub-system 14. The functions of the conventional TDMA receive side sub-system 14 are numerous and include extracting certain data destined for the local station and sending said data to subscribers after possible conversion into other bit formats. Since conventional TDMA receive side apparatus is well known in the art and further since such equipment is not a feature of the subject invention, no further details of the sub-system 14 are described herein. The only outputs shown in FIG. 1 from sub-system 14 are output lines 16 and 18 designated as the reference unique word and local unique word outputs. As is well known there are many other outputs from the sub-system 14 but for purposes of understanding the present invention only the latter two outputs are shown. A pulse or logic signal occurs on line 16 when the receiver receives and detects the reference unique word from the preamble of the reference station burst. A pulse or logic signal appears on output line 18 when the receiver receives and detects the unique word contained in the burst of the local station, i.e., the burst which the local station transmitted.

Referring again to FIG. 2, the synchronization system which maintains the burst in its proper time slot will now be described. The reset control means 26, mentioned above, actually does more than reset the frame counter every time it reaches a count of N. In the burst synchronization function, the reset control 26 is adapted to receive three logic inputs on lines designated as N, N+1, and N−1. As will appear more fully hereafter only one of these logic inputs controls the reset means 26 at any one time. When a logic 1 signal, for example, appears on the N line, the reset control means 26 responds to the count of N in the frame counter 20 to reset the frame counter. When a logic 1 signal appears on the N+1 line, the reset control means 26 responds to a count of N+1 in the frame counter 20 to reset the frame counter. When a logic 1 signal appears on the N−1 line, the reset means 26 responds to the count of N-1 in the frame counter 20 to reset the frame counter. The reset control means 26 as described thus far may simply comprise three individual decoders which respectively decode counts of N, N+1, and N−1 and which are enabled respectively by the logic 1 signals on the lines N, N+1, and N−1. As will be apparent, when the reset control means 26 is operating to reset the frame counter 20 every N+1 count, the start burst signal 24 will be delayed in time one bit position each frame. When reset control means 26 operates to reset the counter every N−1 count, the start burst signal 24 will be advanced one bit position each frame. The logic signals control the advancement or retardation of the start burst signal to effectively move the local station burst forward or backward, as the need occurs, to position the station burst in the proper time slot.

In order to determine the direction and how far the burst must be moved to put it in the exact position, means are provided to measure the exact position of the burst within the received frame and to compare that position with the pre-assigned position of the burst. The latter means will now be described.

The detected reference unique word pulse and the detected local unique word pulse from the sub-system 14 of FIG. 1 are applied through correction rate logic 34 to digital delay counter 36 and comparator 42, respectively. The correction rate logic 34 is a logic circuit which passes the unique word pulses only once every one-third second. The purpose of this function is to cause the synchronizer to compare the actual burst position with the assigned burst position only once each one-third of a second. One-third of a second is the approximate roundtrip delay time to the satellite and once a correction is made it will not appear again at the receiver until a delay of one-third of a second. Consequently, it is not useful to provide correction any more often than one-third of a second. The reference unique word is applied to a digital delay counter 36 which has a number stored therein, said number corresponding to the pre-assigned time difference between the reference burst and the local station burst within the frame. Upon receipt of the reference unique word the digital delay counter 36 begins counting down at a clock rate (clock pulses not shown) and reaches a count of 0, or recycles, at the exact time at which the local unique word would occur if the local station burst is in the exact pre-assigned position. When the digital delay counter 36 recycles it provides an output pulse to comparator 42. The local unique word pulse is applied directly to comparator 42. If the local station burst is in the exact pre-assigned position the two pulses applied to comparator 42 will occur simultaneously and the comparator will not provide any output. However, if the two inputs to comparator 42 do not occur simultaneously the comparator 42 will provide a polarity output to the error polarity circuit 40 and will provide a time duration output to the AND gate 48. The error polarity signal indicates whether the local unique word pulse precedes or succeeds the output from the digital delay counter 36. If the local unique word precedes the output from digital delay counter 36, that means the burst position of the local station burst is in advance of the pre-assigned position and a logic 1 output appears on the plus line from error polarity circuit 40. On the other hand, if the local unique word pulse occurs subsequent to the output from digital delay counter 36, that means that the local station burst is lagging behind its pre-assigned position and a logic 1 pulse will appear on the minus output line of error polarity 40. Irrespective of the polarity of the error, an output gate pulse from comparator 42 occurs which has a time duration equal to the time separation of the two pulses applied thereto. Thus, the time duration of the pulse applied to gate 48 represents the effective time difference between the actual burst position and the pre-assigned burst position. The gating pulse of comparator 42 allows locally generated clock pulses to pass through AND gate 48 and be applied to the UP count input of the error storage up/down counter 46. Thus, the number of counts entered into error storage up/down counter 46 corresponds to the number of bit positions which the burst must be moved to place it in the exact pre-assigned position.

The contents of error storage up/down counter 46 is applied to a decoder 44 which provides a logic 1 output whenever the error storage up/down counter 46 contains a count other than 0. In other words, as long as there is an error which has to be corrected, there will be a logic 1 output from decoder 44. The logic 1 output from decoder 44 is applied to AND gates 30 and 32. The second inputs to the AND gates 30 and 32 are applied respectively from the minus and plus outputs from error polarity circuit 40. For the present, the third inputs to the gates 30 and 32 may be ignored. As will be apparent, when there is an error to be corrected only one of the gates 30 and 32 will be fully energized, and the one which is energized will be the one to control movement of the start burst signal in the proper direction. For example, if the correction must be in a direction to advance the burst position, gate 32 will be fully energized to provide a logic 1 on the N−1 input to reset control means 26. On the other hand, if the correction must be in a direction to retard the start burst signal, gate 30 will be fully energized to provide a logic 1 output on the N+1 input to the reset control means. As a consequence, the start burst signal on line 24 and also the actual burst transmission time will be shifted one bit per frame in the desired direction. During correction, each start burst signal 24 will also be applied through gate 50 to the down count input of error storage up/down counter 46. Gate 50 will be energized to pass said start burst signals because during correction there will be a logic 1 output from decoder 44. When the start burst signal has been shifted a number of bits corresponding to the number originally entered in the error storage up/down counter 46, the error storage up/down counter will have been counted down to 0, the decoder 44 will no longer provide a logic 1 output, and the gates 30 and 32 will no longer be energized. The logic outputs from gates 30 and 32 are applied to gate 28 in such a manner that gate 28 will not provide a logic 1 output as long as there is a logic 1 output at either gate 30 or gate 32. The inputs to gate 28 are shown as inhibit inputs by way of example. The third input to gate 28 may be ignored for the present. Thus, as can be seen from the logic described thus far, when there is an error it is corrected by providing a logic 1 signal on either the N+1 or the N−1 inputs to reset control means 26. When the error is corrected a logic 1 signal will appear on the N input to reset control means 26 to thereafter cause the start burst signal 24 to stay in the exact same position relative to the frame.

The burst synchronization apparatus described thus far is described with additional detail in the Gabbard patent mentioned above. It is also described in the same general terms in the above-mentioned Schmidt et al application wherein its function in combination with the overall function of a TDMA transmit/receive system is also described. The burst synchronization means also includes a sync loss detector 38 which receives the reference unique word pulse and the local unique word pulse at the output of correction rate logic 34 and which determines whether or not the local station burst is sufficiently close to its pre-assigned position to be considered as being synchronized. The exact measure of closeness is not important to an understanding of the present invention. When the local unique pulse is either not received or is far removed from a time when it would occur if the burst is properly synchronized, the sync loss detector 38 provides a logic output of the sync loss line which indicates that the burst is not synchronized. This logic output also indicates that the burst should be discontinued becuase, due to the lack of synchronization, it may be overlapping other burst from other stations.

Everything described thus far in the detailed description portion of this application represents prior art. The additional logic which is added to the prior art to result in the invention herein will now be described in detail. When the station is first turned on, or when the sync loss detector 38 indicates that there is a loss of synchronization, an output appears from OR gate 128 (FIG. 2) which sets the A flip-flop 122. The output from OR gate 128 starts the acquisition mode of operation, during which the proper time slot is located. The output from flip-flop 128, indicated as $FF_a$, is applied in FIG. 3 to the reset input of flip-flop 106. When flip-flop 106 is reset the enable output therefrom is removed thus disabling preamble generator 52 and the modulator 62. This will prevent generation of the preamble and will also prevent the transmission of the local station burst. Also as shown in FIG. 3 output $FF_a$ is applied to the reset input of flip-flop 118 thereby removing the enable output from flip-flop 118 disabling data generator 54.

Referring back to FIG. 2, the output from the A flip-flop 122 also passes through an OR gate 144 whose output is applied to an inhibit input of gate 28 and to the set input terminal of the D flip-flop 146. When flip-flop 146 is in the set condition it will apply a logic 1 output to inhibiting inputs of gates 30 and 32. Thus, during this phase of the acquisition mode, gates 28, 30, and 32 will be inhibited and therefore a logic 1 input to the reset control means will not appear on any of the N, N+1, or N−1 inputs. The output from the A flip-flop 122 is further applied to an N+2 input of reset control means 26. In the example described herein the reset control means 26 will additionally include a decoder which responds to a count of N+2 in the frame counter 20 and another decoder which will respond to a count of N−K in the frame counter 20. The logic 1 signal at the N+2 input to reset control means 26 causes the frame counter 20 to recycle every N+2 input clock pulses. This causes the start burst signal 24 to shift, in a backward direction, two bits every frame.

Referring again to FIG. 3, and as pointed out above, during this phase of the acquisition mode the normal burst cannot be transmitted. Instead, the start burst signal controls the generation of an acquisition signal. The output from the A flip-flop 122 is applied, in FIG. 3, to the set input of flip-flop 104, thereby enabling a two-phase psk modulator 100. The start burst signal is applied to a binary counter or divide by 2 counter 98 whose output is the modulation input to the modulator 100. The modulator 100 also receives a 60 MHz carrier frequency from local oscillator 102. The 60 MHz frequency is preferably selected to be different than the oscillator frequency supplied to the four-phase modulator by oscillator 64. The start burst signals occur at the nominal frequency of 8 kHz and thus the output from divider 98 will be a square wave having a nominal frequency of 4 kHz. The transitions of the 4 kHz square wave constitute the acquisition signal. The square wave is said to be at the nominal frequency of 4 kHz because, as will be apparent, the transitions are shifted two bits per frame due to the operation of the reset control means 26 which is now responding to the logic signal on the N+2 input. The modulator 100 provides an output which is 20 dB down in power from the normal power output of the modulator 62. The purpose of providing a lower power acquisition signal is to insure that the acquisition signal will not seriously interfere with the burst from the other stations. The modulated acquisition signals are applied through the power combiner 66 and subsequently to the transmit circuitry. The acquisition signal, or transitions in the 4 kHz signal, occur once each frame but due to the operation of the reset control means 26, the transitions will precess or scan across the frame. Assuming a clock rate of 50 megabits/sec. and a scan rate of 2 bits per frame (i.e. recycle at N+2), it will require 3,125 frames to scan completely across the TDMA frame. That number of frames is equal to a time period of approximately 0.4 seconds.

The acquisition signals along with the burst from the other stations will be received after being repeated by the satellite at the receive side of the local station as shown in FIG. 1. A narrow bandpass filter 72 centered at 60 MHz will pass the acquisition signals to a two-phase psk demodulator 74 which provides an output 4kHz square wave having the same transitions as appeared at the input to the two-phase psk modulator 100 of FIG. 3. The normal bursts from the other stations will continue to be demodulated in the four-phase psk demodulator 12 and will continue to be operated on by the conventional TDMA receive side sub-system 14. However, there will be no local unique word pulse out of the sub-system 14 because the local station is not transmitting its regular burst during this phase of the acquisition mode. The transitions on the 4kHz output signal from the demodulator 74 are detected by a transition detector 76 which provides an output pulse or spike in response to each transition. The exact point of occurrence of the transitions will, during much of the scanning mode, have a lot of jitter due to the noisy environment caused by the normal burst of the other stations. However, the system includes logic, to be explained subsequently, which detects the acquisition signals as they appear at the output of the transition detector 76 only when said acquisition signals occur during a specific portion of the time slot assigned to the local station burst. When the acquisitions occur during the latter-mentioned specific portion of the time slot there will not be any noise caused by simultaneous reception of bursts from other stations because there will be no bursts occuring during the time slot pre-assigned to the local station. The specific logic referred to above includes a means for generating a window or aperature which covers a portion of the time slot assigned to the local station burst. As illustrated in FIG. 1, the latter means includes an aperature generator 80 which receives clock pulses 78 and the reference unique word pulse 16 from the sub-system 14. The clock pulses may be locally generated at the bit rate of 50 megabits per second. The aperature generator provides an output gating pulse which begins a predetermined time after the aperature generator 80 receives the reference unique word pulse. The latter predetermined time is selected so that the output gating pulse starts either at the beginning of the pre-assigned time slot for the local station burst or at some short period thereafter and terminates prior to the end of said time slot. As an example, the aperature generator 80 may provide a gating output which covers the first fourth of the time slot assigned to the burst of the local station. The latter gating pulse energizes AND gate 82 so that only those acquisition signals detected during the window or aperature period will pass through AND gate 82. When an acquisition signal appears at the output of gate 82 it indicates that the acquisition signal has arrived within the first quarter of the time slot. This could be used to cause the acquisition apparatus to enter into the next phase but in order to be certain that the output signal appearing from gate 82 is not a spurious noise signal, the acquisition signals at the output of gate 82 are applied to a decision logic circuit which as illustrated in FIG. 1 is a three out of five decision circuit. That is, starting from the first acquisition signal appearing at the output of AND gate 82, if there are three acquisition signals detected during a period extending over five frames, the logic commands the acquisition system to enter into its next phase. The logic includes a flip-flop 86, a divide by three counter 84, a divide by 4 counter 88, and AND gate 92 and an OR gate 96. The acquisition pulses from AND 82 are applied to set the flip-flop 86. When the flip-flop 86 is set, all the following aperatures are passed through AND gate 92 and counted by the divide by 4 counter 88. It will be noted in this example that the aperature pulse which gated the first acquisition signal through AND gate 82 will not pass through AND gate 92. The next four aperature pulses will be counted by the divide by 4 counter 88 which then provides a reset output which passes through AND gate 90 and resets the divide by 4 counter to zero. The reset output from counter 88 also resets flip-flop 86 and resets the divide by 3 counter 84. Thus it will be apparent that the flip-flop 86 and the divide by 3 counter 84 will be reset five frames after the first acquisition pulse passes through AND gate 82. If, during those five frames, three acquisition pulses appear at the output of AND gate 82, the divide by 3 counter 84 will provide an output on line 96 which is designated as the force N-K output. The latter output switches the acquisition system into its second phase. It will also be noted that the occurrence of a sync logic signal from the sync loss detector 38 shown in FIG. 3 resets the three out of five decision circuit so that both counters and the flip-flop 86 are cleared at the start of the acquisition mode.

In order to understand the next phase of the acquisition mode it is necessary to understand the significance of the occurrence of an output on line 96 in FIG. 1. When an output pulse appears on line 96 it means that the acquisition signal last received is positioned within the window which covers the first fourth of the local station's time slot. It also means that the start burst signal which initiated said latter mentioned acquisition signal at the transmitter occurred at the proper time to cause said acquisition signal to occur within the first quarter of the time slot. However, the acquisition signal which was generated by the latter mentioned burst start signal had to travel from the local station transmitter up to the satellite and back down to the local station receiver before it was detected as being in the proper time position. The time of travel, dependent upon the range to the satellite, is known to within a few tenths of a millisecond. Consequently, the number of frames, plus or minus a few frames, which occur during a single round trip time is also known. Assuming that X frames, plus or minus a few frames, is the number of frames generated during a single round trip delay time, it will be appreciated that the burst signal, which is retarded two bits per frame, will have been retarded by 2X bits from its accurate position by the time that the output pulse appears on line 96 of FIG. 1. In order to reobtain the proper timing of the start burst signal, the output pulse on line 96 forces the burst start time forward in time by K bits where K equals 2X. This is accomplished by forcing the frame counter 20 to recycle, only once, at a count of N—K. This is accomplished as follows. The force N—K pulse on line 96 is applied to the set input of a flip-flop 120 shown in FIG. 2. The set output from flip-flop 122 is provided as one input to AND gate 130. The reset output from reset control means 26 is provided as a second input to AND gate 130. Thus, the first reset pulse occurring after flip-flop 120 is set passes through AND gate 130 thereby resetting the A flip-flop 122 and setting the B flip-flop 124. The output from 130 also resets flip-flop 120 to insure that the divide by N—K phase of the acquisition mode occurs only once. When flip-flop 122 is reset and flip-flop 124 is set the following controls occur. Gate 28 remains disabled because the output from the B flip-flop 124 also passes through OR gate 144 to an inhibit input of gate 28. Gates 30 and 32 will remain disabled because the B flip-flop 146 will still be in its set condition. The logic 1 signal on the N+2 input to the reset control means 26 will be removed and a logic 1 signal will appear on the N—K input to the reset control means 26. Referring to FIG. 3, the output from the B flip-flop is also applied to the reset input of flip-flop 104, thereby disabling the two-phase PSK modulator 100 and preventing the transmission of any further acquisition signals.

Referring back to FIG. 2, since a logic 1 input now appears on the N—K input line to reset control means 26, the reset control means will respond to a count of N—K in the frame counter 20 by generating a reset pulse. This causes the start burst signal on line 24 to be advanced by K bits which puts the start burst signal, relative to the frame, at the proper timing position which previously caused the acquisition signal to appear in the first quarter of the pre-assigned burst time slot. As soon as the latter mentioned reset pulse occurs the acquisition system enters into the third phase wherein the frame counter is forced to recycle at a count of N, thereby maintaining the start burst signal 24 in the correct position relative to the frame.

The third phase is actuated as follows. Since the B flip-flop 124 has been placed in a set condition, it will provide one input to AND gate 140. When the reset pulse appears on the output of reset control means 26, it passes through AND gate 140 thereby resetting the B flip-flop 124 and setting the C flip-flop 126. When the B flip-flop 124 is reset and the C flip-flop 126 is set, the following conditions occur. The logic 1 signal is removed from the N−K input to the reset control means and is also removed from the intput to gate 28. The D flip-flop 146 will still be in the set condition thereby continually disabling gates 30 and 32. As a result, gate 28 will be fully enabled and a logic 1 signal will appear at the N input to reset control means 26 causing the frame counter to recycle at exactly the frame rate. The set output from C flip-flop 126 also sets flip-flop 106 (FIG. 3) thereby enabling the preamble generator 52 and the four-phase PSK modulator 62. It will be noted that at this time the data generator 54 remains disabled. Thus, during the third phase of the acquisition mode each start burst signal will cause the preamble portion of the burst to be generated, modulated, and transmitted. The frame counter 20 will be continuously recycling every N clock pulses thereby holding the burst in a fixed position relative to the beginning of each frame. The aforementioned fixed position will start at some time within the first quarter of the pre-assigned time slot. The reason for forcing the frame counter 20 to recycle at exactly the frame rate rather than allowing the burst synchronizer to take over complete control during the third phase of the acquisition mode is also a result of the round trip delay time. As is apparent, as soon as the system enters the third phase and begins transmitting the preamble portion of its burst, another one-third of a second will be required before the preamble is received at the receiver. Thus, if the burst synchronizer were allowed to be fully operative during the one-third of a second waiting period, it could result in a large error being entered into the error storage up/-down counter 46 or could result in a sync loss detection.

The fourth phase of the acquisition mode is entered into after a delay of one-third of a second corresponding to the approximate round trip time of a signal through the satellite. The logic 1 output signal from flip-flop 126, which started the third phase, is delayed by one-third of a second in delay means 142. The output of delay means 142 resets the D flip-flop 146 thereby removing the inhibiting input from gates 30 and 32. At this time, none of the gates 28, 30, and 32 are inhibited by the acquisition logic but instead these gates are allowed to resume their normal control function in the burst synchronizer apparatus. Thus, during phase four, normal burst synchronization occurs in a manner which will pull the burst to its exact pre-assigned position within the time slot. During this initial synchronization operation the data generator 54 will remain disabled until the burst synchronizer has pulled the burst into its exact pre-assigned position. When the latter condition occurs the data generator 54 will be enabled and normal full burst transmission will resume. The logic for determining when data generation can begin is illustrated in FIG. 3 and, by way of example, includes gating means 108, divide by two counter 110, AND gate 116, and invert gates 112 and 114. The logic operates generally as follows. As soon as the apparatus enters into the normal burst synchronization operation, i.e., when an output appears from delay means 142, the logic waits a few frames and then tests the error storage up/down counter 146 for a 0 error. As soon as a 0 error occurs, indicating that the start of burst has moved to its proper pre-assigned position, the data generator is enabled. Specifically, the output from delay means 142 is applied as one input to AND gate 108. The next two burst start signals pass through AND gate 108 and are counted by the divide by 2 counter 110 whose output, after two counts, inhibits further passage of any pulses through AND gate 108. Thus, at least one frame following the occurrence of the output signal from delay means 142 there will be a logic 1 output from divider 110 which will be held until the divider is subsequently reset. The error storage up/down counter 46 is tested for 0 error by applying the output from decoder 44 through an invert gate 114 to the AND gate 116. When 0 error occurs, the output from decoder 44 will be a logic 0 causing the output from invert gate 114 to be a logic 1. When this condition takes place some time after the divide by 2 counter 110 provides a logic 1, an output will appear at the output terminal of AND gate 116 which will set flip-flop 118 and reset the divide by 2 counter 110. The setting of flip-flop 118 enables data generator 54 and normal full burst transmission resumes.

Although the above-mentioned was described for a case where the acquisition signal is precessed two bits per frame during the first phase of acquisition, it will be apparent that it could be precessed a different number of bits, for example four bits per frame or eight bits per frame, etc., to achieve faster scanning. Also, it is not necessary that the acquisition signal be scanned backward as done in the specific example described. For example, if during the first phase the frame counter is caused to recycle at N−2 rather than at N+2, the acquisition signal will be shifted two bits per frame in a forward direction. Thus, when the acquisition signal is detected, in order to properly reposition the burst start signal, the frame counter will recycle once at a count of N+K rather than at a count of N−K. The important thing is that the start burst signal be shifted in a direction opposite to the scanning direction in an amount equal to the amount said burst start signal was shifted during the round trip delay time. In general terms, the frame counter recycles at a count of N+*m*, where *m* may be a positive or negative integer, and upon detection of the acquisition signal, recycles once at a count of N−K, where K equals *m* times X.

Also, although the frame counter in the apparatus was indicated as being controlled by clock pulses appearing at the bit rate it could be equally applicable for the frame counter to be controlled by clock pulses occurring at the symbol rate, wherein the symbol rate is a function of the bit rate and a function of the N-phase PSK modulation. For example, where four-phase PSK modulation is used the symbol rate is one-half the bit rate. The acquisition signal could thus be precessed one or two symbols per frame rather than two or four bits per frame.

What is claimed is:

1. In a TDMA system of the type in which multiple stations access a repeater on a time divided basis by periodically transmitting bursts of communication which form a TDMA frame, wherein at least one burst in said frame includes a frame reference indicia and wherein all other bursts include a normal reference indicia, and wherein all bursts have assigned time slots within said TDMA frame, the improvement comprising, at a local station, a. means for generating a periodic start signal occurring at said frame rate,
b. acquisition signal generating means for generating and transmitting an acquisition signal at a substantially lower power than normal burst transmission in response to each said start signal,
c. scanning means, responsive to said initiating means for shifting the start signals $m$ bits per frame in one direction, whereby said acquisition signals are effectively scanned across said frame at the rate of $m$ bits per frame,
d. receiver means for receiving bursts and acquisition signals relayed via said repeater,
e. means responsive to the reception of said frame reference indicia for generating an aperture during the time slot assigned to said local station, and
f. means responsive to the reception of said acquisition signals during said aperture for disabling said scanning means and for shifting said start pulses K bits in a direction opposite to said one direction where K equal $m$ times the approximate number of frames generated during a round trip delay from the station to the repeater and back to the station.

2. Apparatus as claimed in claim 1, wherein said means responsive to said acquisition signals comprises, a. means for detecting each received acquisition signal which arrives in coincidence with said aperture,
b. first counter means responsive to said detected acquisition signals for providing an output signal when $x$ detected acquisition signals are applied thereto prior to said first counter means being reset,
c. second means responsive to said detected acquisition signals and to said apertures for providing a reset output $y$ frames after detection of said first detected acquisition signal, said reset output being connected to reset said first counter means and said second means, and where $y \geqslant x$,
d. first logic means responsive to the output pulse from said first counter means for causing said scanning means to be disabled, and
e. said second logic means responsive to the output pulse from said first counter means for causing said start signal generating means to shift its start signals K bits in said opposite direction.

3. Apparatus as claimed in claim 1, wherein said start pulse generating means comprises, a. a source of clock pulses,
b. a frame counter for counting said clock pulses from said source,
c. first recycle means for causing, when actuated, said frame counter to recycle when it reaches a count of N, where N clock pulses is the number of clock pulses in a frame,
d. second recycle means for causing, when actuated, said frame counter to recycle at a count of N+$m$, where $m << N$ and is either a positive or negative integer,
e. third recycle means for causing, when actuated, said frame counter to recycle at a count of N−K, where K equals $m$ times the approximate number of frames generated during said round trip delay time, and
f. decoder means connected to said frame counter for providing a start pulse output when said frame counter reaches a fixed count, said fixed count being no greater than the lesser of N or N+$m$.

4. Apparatus as claimed in claim 3, wherein said scanning means comprises, a. means for disabling said first and third recycle means, and
b. means for actuating said second recycle means.

5. Apparatus as claimed in claim 4, wherein said means for shifting said start pulses K bits comprises, a. means for disabling said first and second recycle means and actuating said third recycle means, and
b. means responsive to the first recycle caused by said third recycle means for disabling said third recycle means and for actuating said first recycle means.

6. Apparatus as claimed in claim 5, wherein said acquisition signal generating means includes an acquisition signal modulator having a power output which is at least 20 dB down from the power output of the normal burst transmission.

7. A local station for a TDMA communications network of the type wherein each station is assigned a time slot within a TDMA frame for accessing a repeater, said local station being of the type which includes, a. source of clock pulses,
b. frame counter means for counting said clock pulses,
c. first recycle means for causing said frame counter to recycle when it reaches a count of N, where N is equal to the number of clock pulses per TDMA frame,
d. decoder means responsive to a fixed count of said frame counter for providing output start pulses,
e. burst transmission means, including preamble generator means and data generator means, responsive to each said start pulse for transmitting a burst of communication, said burst including a preamble portion and a data portion and said preamble portion including a unique code word,
f. receiver means for receiving communications repeated by said repeater, said receiver means including means for providing a frame reference signal upon receipt of a particular predetermined reference code, and means for providing a local station signal upon receipt of said unique code word in the preamble of said local station,
g. means responsive to said frame reference signal and said local station signal for accumulating an error amount representing the position error of said local station burst in said TDMA frame,
h. second recycle means responsive to said error amount for causing said frame counter to recycle at a count of N+$p$ until said error amount is eliminated, where $p$ is an integer much less than N and is either positive or negative dependent upon the direction of said position error, i. means responsive to the operation of said second recycle means for disabling said first recycle means while said second recycle measn is operating to cause recycling at N+$p$, and j. means responsive to said frame reference signal and said local station signal for providing a sync loss output signal when the local station burst is not within a predetermined range of its assigned position in the TDMA frame, the improvement comprising:

aa. means, when enabled, responsive to said start pulses for generating and transmitting an acquisition signal at a power substantially lower than the power of said local station burst, bb. third recycle means for causing said frame counter to recycle at a count of N+$m$ where $m$ is a positive or negative integer much less than N, cc. fourth recycle means for causing said frame counter to recycle at a count of N−K, where K equals $m$ times the approximate number of TDMA frames per round trip time to the repeater, dd. first logic means for disabling said burst transmission means and said first and second recycle means, and for enabling said acquisition signal generating means and said third recycle means, said first logic means being actuated by said sync loss signal or by turn on of said station, ee. means responsive to said frame reference signal for generating an aperture pulse which covers a portion of the time slot assigned to said local station, ff. means responsive to said aperture pulses and connected to said receiver means for detecting acquisition signals received during the time covered by said aperture pulses, gg. second logic means responsive to the detection of a predetermined number of acquisition signals during a predetermined number of frames for disabling said third recycle means and enabling said fourth recycle means, and hh. third logic means for disabling said third recycle means and for enabling said burst transmission means and said first recycle means after said third recycle means has caused one recycling of said frame counter.

8. The improvement as claimed in claim 7 wherein said first logic means comprises separate means for disabling the transmission of the preamble portion and the data portion of said burst, and wherein said third logic means comprises, a. means following the first recycle of said frame counter at N−K for enabling said first recycle means to cause said frame counter to recycle at counts of N, and for enabling the transmission of the preamble portion only of said burst, b. means operative a fixed delay time after operation of said last-mentioned means for enabling said second recycle means, whereby said first and second recycle means and said error accumulating means become operative to alter the start pulses and place the now generated preamble in the proper assigned position, and c. means operative a short delay after the operation of said last-mentioned means for testing said error amount and enabling the transmission of said data portion of said burst when said error amount is reduced to a predetermined value.

9. The improvement as claimed in claim 7 wherein said means for detecting acquisition signals received during the time covered by said aperture pulses comprises, a. gating means responsive to the coincidence of a received acquisition signal and an aperature pulse for providing an output pulse, b. counting means for counting said output pulses and providing a detection indicating signal upon the accumulation of a predetermined number of said output pulses, c. means responsive to the first said output pulse for resetting said counting means a predetermined number of frames thereafter, whereby a detection signal is generated by said counting means only if said predetermined number of output pulses occur within said predetermined number of frames.

* * * * *

UNITED STATES PATENT OFFICE
CERTIFICATE OF CORRECTION

Patent No. 3,813,496 Dated May 28, 1974

Inventor(s) WILFRID G. MAILLET

It is certified that error appears in the above-identified patent and that said Letters Patent are hereby corrected as shown below:

IN THE SPECIFICATION:

Column 1, line 11 - before "pre-assigned" delete "a" and insert --at--

Column 4, line 4 - after " it is" insert --in--

Column 7, line 12 - after "reset" insert "control--
line 30 - after "exact" insert --correct--

Column 9, line 25 - after "output" delete "of" and insert --on--
line 32 - delete "burst" and insert --bursts--

Column 12, line 2 - delete "Figure 3" and insert --Figure 2--
line 27 - after "burst" insert --start--

Column 15, line 55 - before "second" delete "said"

Column 16, line 38 - before "source" insert --a--

Column 17, line 5 - delete "measn" and insert "means--

Signed and sealed this 8th day of October 1974.

(SEAL)
Attest:

McCOY M. GIBSON JR.
Attesting Officer

C. MARSHALL DANN
Commissioner of Patents